(12) United States Patent
Sawada et al.

(10) Patent No.: US 6,474,063 B2
(45) Date of Patent: Nov. 5, 2002

(54) TRAVEL MOTOR HYDRAULIC CONTROL SYSTEM FOR A CONSTRUCTION MACHINE

(75) Inventors: Hiroshi Sawada, Neyagawa; Seiichi Fuchita, Katano; Kouichi Kawamura, Hirakata; Toshio Yokoyama, Uji, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/912,304

(22) Filed: Jul. 26, 2001

(65) Prior Publication Data

US 2002/0029566 A1 Mar. 14, 2002

(30) Foreign Application Priority Data

Jul. 28, 2000 (JP) ........................................ 2000-229302

(51) Int. Cl.[7] .............................................. F16D 31/02
(52) U.S. Cl. ............................. 60/426; 60/484; 60/486
(58) Field of Search .......................... 60/421, 426, 427, 60/428, 429, 430, 484, 486

(56) References Cited

U.S. PATENT DOCUMENTS

| 3,448,577 A | * | 6/1969 | Crawford ................. 60/427 X |
| 4,030,623 A | * | 6/1977 | Bridwell et al. .......... 60/421 X |
| 5,211,014 A | * | 5/1993 | Kropp ......................... 60/421 |
| 5,568,727 A | * | 10/1996 | Chung ......................... 60/421 |
| 5,970,709 A | * | 10/1999 | Tohji .......................... 60/421 |
| 6,170,261 B1 | * | 1/2001 | Ishiziki et al. ............... 60/421 |
| 6,276,133 B1 | * | 8/2001 | Yoshida et al. .............. 60/421 |

* cited by examiner

Primary Examiner—John E. Ryznic
(74) Attorney, Agent, or Firm—Varndell & Varndell, PLLC (57) ABSTRACT

A travel motor hydraulic control system for a construction machine having a plurality of hydraulic pumps which supply individually pressurized fluid for a plurality of hydraulic travel motors and a plurality of flow control valves which control the flow rate of the pressurized fluid to be supplied to the motor during an ordinary work. A controller receives a control signal representative of a travel control lever stroke sensed by a position sensor and a control signal detected by a pressure sensor, determines if the vehicle is traveling up a slope, and transmits a command signal to a solenoid operated valve to move a pilot operated shut off valve toward a valve-closing position, thereby the travel hydraulic motors are individually supplied the pressurized fluid from the hydraulic pumps.

6 Claims, 7 Drawing Sheets

TRAVEL MOTOR HYDRAULIC CONTROL SYSTEM FOR A CONSTRUCTION MACHINE

TECHNICAL FIELD

The present invention relates to a travel motor hydraulic control system for a construction machine such as a hydraulic excavator and the like.

BACKGROUND ART

A travel motor hydraulic control system for construction machine such as a hydraulic excavator and the like have provided in the prior art, a respective hydraulic motor positioned at each side of the machine which is respectively supplied with the pressurized fluid, so as to rotate the respective wheel through the directional control valve from a hydraulic pump. In this type of the travel motor hydraulic control system, a left and right hand motor are designed to be supplied with the combined pressurized fluid of the hydraulic pumps through the directional control valve so as to ensure straight travel of the machine.

Variation in the flow of the pressurized fluid from respective hydraulic pump tends to prevent the machine from traveling straight when it is in a straight run. Under these circumstances, in the construction machine having a travel motor hydraulic control system for the hydraulic motor, a connection line is provided to connect the left hand hydraulic motor drive circuit disposed between the hydraulic motor and the associated directional control valve with the right hand hydraulic motor drive circuit disposed between the right hand hydraulic motor and the associated directional control valve, thereby enabling one motor drive circuits to communicate with the other motor drive circuit, when it is running such that the machine can travel straight and to prevent the machine from performing zigzag travel due to the occurrence of differential flow of the hydraulic pumps There are known means for ensuring straight travel in construction machine such as a hydraulic excavator. For example, Japanese unexamined patent publication 1997-32043 published on Feb. 4, 1997 assigned to Shin Caterpillar Mitsubishi, Japanese unexamined patent publication 1997-37248 published Feb. 10, 1999, assigned to the assignee of the present application, and Japanese unexamined patent publication 1999-131530 published on May 18, 1999 to Hitachi Construction Machinery are disclosed.

The Japanese unexamined patent publication 1997-32043 discloses a travel control system where a shut-off valve disposed in the control circuit is operated such that the respective hydraulic pump can individually drive the associated hydraulic motor for ensuring straight travel with the machine carrying out operation. The shut-off valve is changed to move in the valve-opening position, so that one of the hydraulic pumps can solely drive the hydraulic motors to keep the machine driving. Furthermore, Japanese unexamined patent publication 1997-37248 discloses a travel control system where a pressure compensating valve that is disposed between a hydraulic motor and a outlet port of associated directional control valve, through which a delivery fluid from a hydraulic pump is supplied to an associated hydraulic motor, connects either of the motor drive circuits to the other motor drive circuit when the pressure compensating valve acts with the pressure at an inlet port thereof, and ensures straight travel.

Further, Japanese unexamined patent publication 1999-131906 discloses that the hydraulic pump individually drives an associated hydraulic motor when the machine is merely traveling, and a shut-off valve is disposed in a connection line between both travel motor drive circuits and is operative to interrupt the connection between the motor drive circuits when the machine is performing a work operation during traveling. As a result, the machine provides a straight travel. Further, Japanese unexamined patent publication 2000-73409 discloses a travel motor drive circuit where a pressure compensated divider is individually disposed between a left and right hand hydraulic pumps and a left and right hand hydraulic motor drive circuit along with attachment drive control circuit, and equally supplies the pressurized fluid to the both motors when the machine is performing a work operation during traveling. As a result, the vehicle provides straight travel.

Thus, many applications have long provided for improving the technology relative to straight travel of the construction machine driven by the hydraulic motor such as a hydraulic excavator. However, those applications have intended merely to maintain a crawler type construction machine traveling straight, when performing works during traveling on a relatively flat ground. In case that the construction machine travels up on the slope with either side track subjected to slip, the pressurized fluid from the hydraulic pump flows only to the light loaded motor which is driving the sprocket under slip and starts to abruptly rotate the motor and the associated sprocket. On the other hand, since the opposite side motor is supplied with a small amount of pressurized fluid, the pressure for driving the opposite side motor is reducing causing the wheel to stop rotating. This results in a downhill steer occurs on the side of the sprocket under slip, resulting in the vehicle preventing from traveling straight. This kind of the problem may occur where either side of the track is subjected to a heavy load while the vehicle is traveling in a mud. The methods have long been required to provide for preventing the vehicle from traveling zigzag under the load variation while it is traveling up a slope. However, the aforementioned drawbacks have not been overcome.

The present invention is directed to overcoming the foregoing and other shortcomings and drawbacks of travel control of a construction machine. The object of the present invention is to provide travel control that a controller mounted on the machine that receives a differential electrical signal representative of the differential pressure from the travel pressure control valve connected to manually operable control levers when machine is traveling, determines if the differential electrical signal exceeds a predetermined value, the machine is steered in the reverse direction of the wheel under slip. It is assumed the machine is traveling straight if the differential electrical signal is less than respective predetermined value. With such circumstances, in the case where the load pressure is less than a predetermined value while the machine is running on the flat ground, the machine is recognized to travel up a slope if the load pressure exceeds a predetermined value.

In order to achieve the foregoing object, the machine in the present invention provides a travel control system for a construction machine having a left and right hand hydraulic pump which supply individually pressurized fluid for a left and right hand travel motor, and the associated directional control valve comprises:

a pilot operated shut-off valve disposed in a connection line which communicates to the left and right hand travel motor drive circuit, a controller containing a first storage unit storing a determination function of traveling straight and the second storage unit storing a determination function of traveling up a slope, receives a control signal representative of a travel control lever stroke sensed by a position sensor and a control signal representative of pressure in respective travel motor circuit sensed by the pressure sensor, determines whether the machine is traveling straight on a flat ground or traveling up a slope, and transmits a command signal to a solenoid operated valve to move the pilot operated shut-off valve towards the valve-closing position, which results in the travel hydraulic motors individually being supplied the pressurized fluid from the hydraulic pumps.

According to the embodiment of the present invention, the respective travel hydraulic motors are normally supplied with the pressurized fluid from the hydraulic pump through the shut-off valve disposed in the connection line which communicates to the both travel motor drive circuits. In the case where the machine travels up a slope, the differential pilot pressure or the differential potential through actuation the left and right hand operation device or electric levers is respectively generated and either load pressures is created, the controller determines whether the differential pilot pressure or the differential potential and the load pressures exceed respectively a predetermined value or not. If the differential pilot pressure or the differential potential is below a predetermined value and the load pressure exceeds a predetermined value, the controller transmits a command signal to the solenoid operated valve to move the pilot operated shut-off valve toward the valve-closing position.

Consequently, both the hydraulic pumps are supplied independently with the pressurized fluid to the corresponding hydraulic motors, and thereby compelled to independently provide straight travel. Even if a slip is created on either of track when the machine is traveling up a slope, the machine is controlled to ensure for providing a straight travel without stopping the machine and engaging downhill steering due to a slip.

According to another embodiment of the present invention, the controller is desirably controlled to transmit the control signal, which is to fed through the solenoid operated valve from a fixed displacement type hydraulic pump, to the shut-off valve if the differential pilot pressure of the travel directional control valves which are connected to the travel motor operable devices, exceed a predetermined value. In case that a electric lever is replaced for the travel motor operable devices, the controller is desirably controlled to transmit a control command signal, which is fed through the solenoid operated valve from the fixed displacement type hydraulic pump, to a shut-off valve if a differential potential through actuation the electric lever exceed a predetermined value.

With such construction, if the differential pressure generated at the travel control valves connected to the travel motor operable devices or the differential potential reaches the predetermined value and the travel load pressure exceeds the predetermined value during traveling, the controller transmits a operation signal to move the shut-off valve towards the valve-closing position to a pilot portion thereof. Consequently, both the hydraulic pumps individually supplied with the pressurized fluid to exert a load pressure to the hydraulic motors. Thus, the present invention has the advantage that even if a slip is created on either of track when the machine is traveling up a slope, a recovery force is obtained to provide straight travel without stopping and exerting downhill steering on the sprocket under slip. As result in the machine is able to travel straight.

Further, if the differential pressure generated at the travel control valves or the differential potential through actuation of the electric lever exceeds the predetermined value, the controller recognizes that the machine is performing a steering operation. Still further, when the differential pressure generated at the travel control valves or the differential potential through actuation of the electric lever exceeds the predetermined value, the controller determines that the machine is traveling up a slope if the load pressure is equal to or exceeds a predetermined value, on the other hand, the machine is running on the flat ground if the load pressure is less than a predetermined value.

Additionally, an inclinometer, or a detecting means for measuring a tilt angle of the machine, is desirably mounted on the machine to generate a signal representative of the inclined angle of the machine to direct to the controller. The controller determines whether the machine is traveling up a slope or not, based on the signal detected by the inclinometer as well as based on the load pressure in the travel control circuit.

BRIEF DESCRIPTION OF THE DRAWINGS

For a better understanding of the invention, reference may be made to the accompanying drawings, in which.

Preferred embodiments of the invention will now be described by referring to the accompanying drawings.

Figure 1:
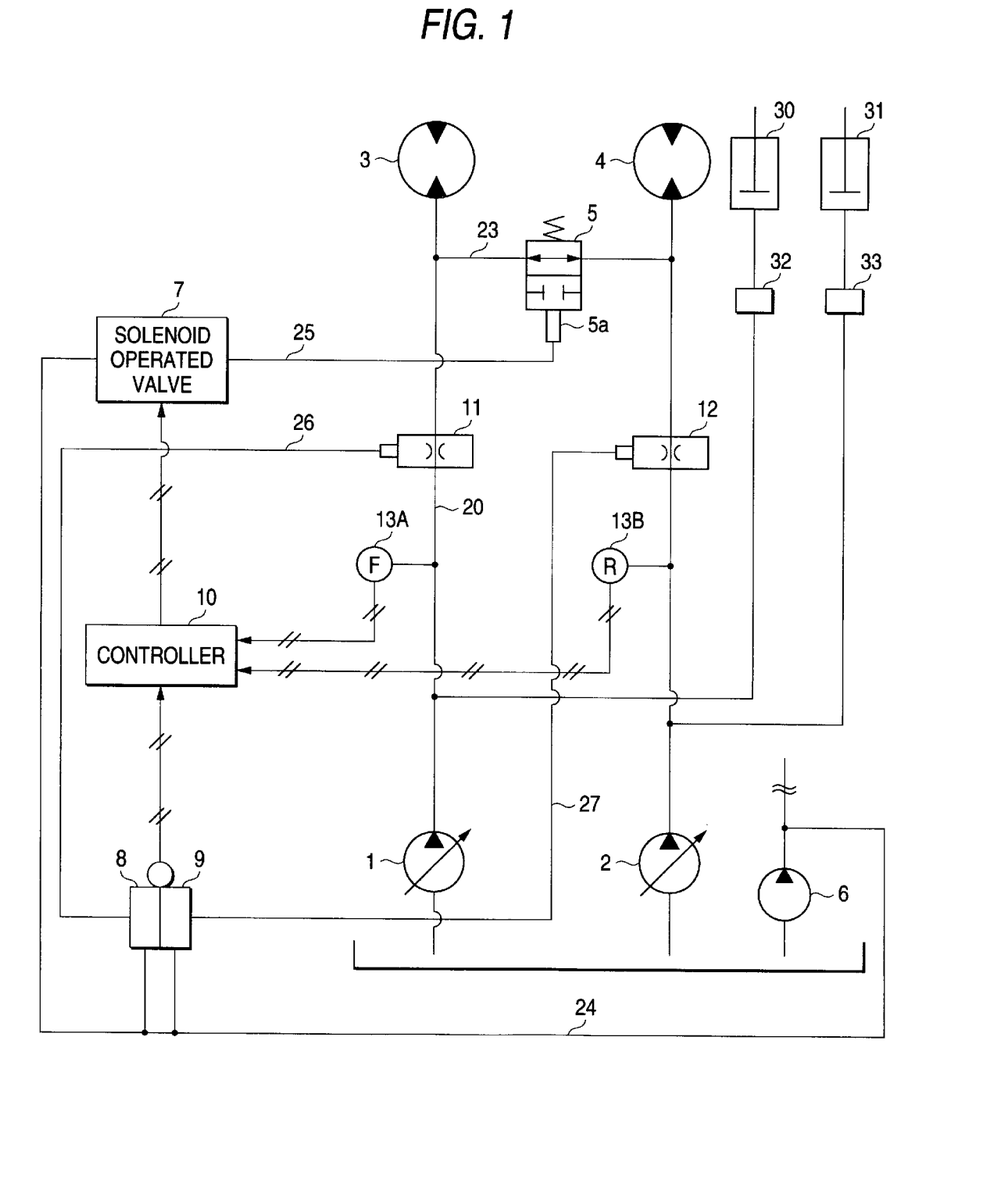
FIG. 1 is a travel motor hydraulic control system of a first preferred embodiment of the present invention.
Figure 2:
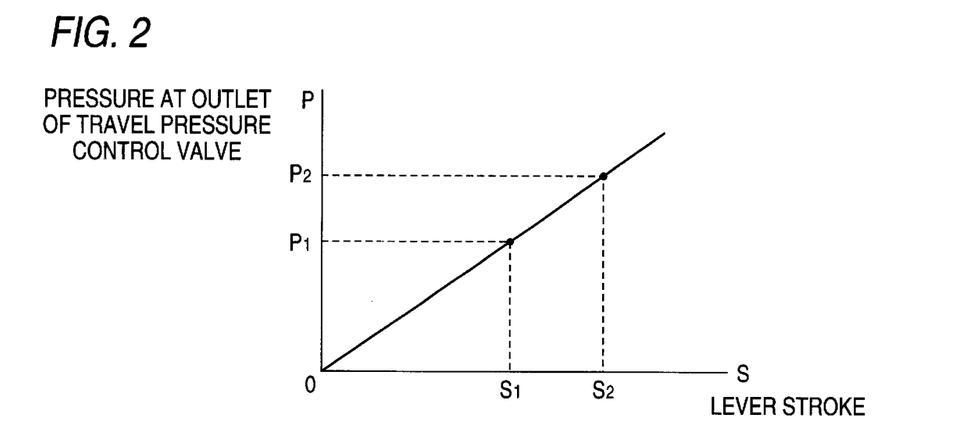
FIG. 2 is a schematic diagram showing the relation between an output pressure of a travel pressure control valve and an amount of stroke of a travel pressure control valve.
Figure 3:
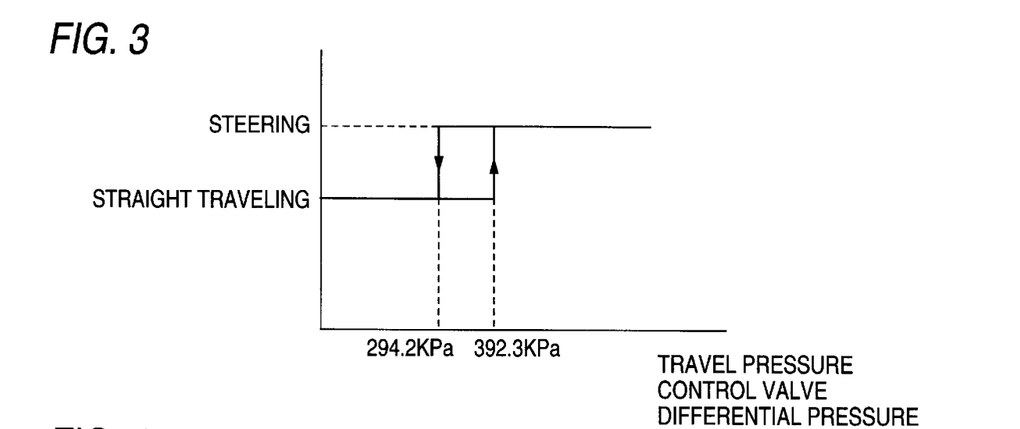
FIG. 3 is a schematic diagram showing the relation between a differential pressure of a travel control valve and the pattern of traveling state, straight travel state or steering state.
Figure 4:
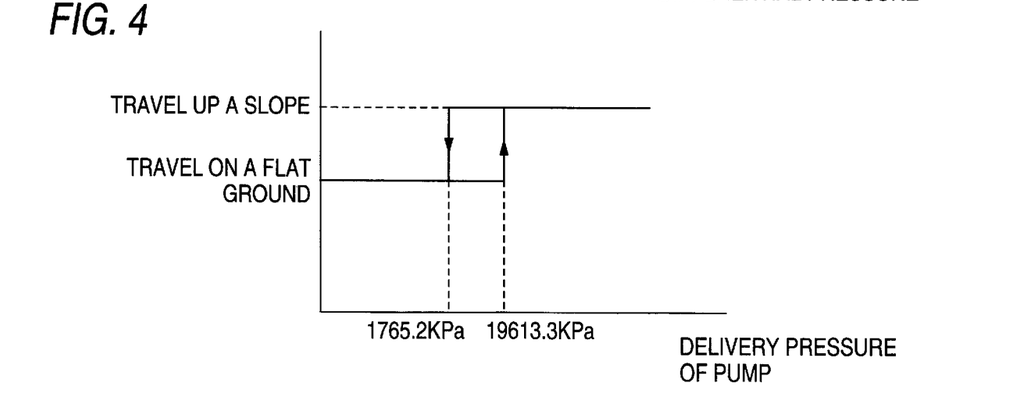
FIG. 4 is a schematic diagram showing the relation between a delivery pressure of the hydraulic pump and the pattern of traveling state, traveling on flat ground and traveling up a slope.

The first embodiment of the present invention relates to a travel motor hydraulic control system of a hydraulic excavator. FIG. 1 shows a travel motor hydraulic control system of a first preferred embodiment of the present invention. FIG. 2 shows a schematic diagram showing the relation between an output pressure of a travel pressure control valve and an amount of stroke of a travel pressure control valve. FIG. 3 shows a schematic diagram showing the relation between a differential pressure of a travel control valve and the pattern of traveling state, straight travel state or steering state. FIG. 4 shows a schematic diagram showing the relation between a delivery pressure of the hydraulic pump and the pattern of traveling state, traveling on flat ground and traveling up a slope.

In a travel motor hydraulic control system of the first embodiment, hydraulic motor drive circuits 20, 21 (return conduit is not shown) through which travel hydraulic motors 3, 4 are individually supplied with the pressurized fluid delivered from two hydraulic pumps 1, 2 driven by a engine (not shown) mounted on the machine, are connected through a connection line 23 each other. A connecting device or a shut-off valve 5 is disposed therein such that it can normally connect between the hydraulic motor drive circuits 20, 21. When the shut-off valve 5 is movable towards the valve-closing position by receiving a pressure signal to a port 5a thereof against a spring through a fixed displacement type control pump 6, a conduit 24, a solenoid operated valve 7, and a pressure signal line 25, the connection between the hydraulic motor drive circuits 20, 21 are interrupted.

While a pilot pressures generated by travel pressure control valves 8, 9 connected to the manually operable lever (not shown) is fed to respective pilot port of travel control valves 11, 12, by which pressurized fluid are controllably to supply the travel hydraulic motors 3, 4, through a fixed displacement type hydraulic pump, a line 26, 27 in response to an amount of the lever stroke, they are independently converted to electrical signals and transmitted to a controller 10. The controller receives a electrical signal representative of a load pressure detected by pressure sensors 13A, 13B disposed in the hydraulic motor drive circuits 20, 21 and transmits a control signal to the solenoid operated valve 7, if the travel load pressure or driving pressure of the travel hydraulic motors 3, 4 respectively exceed a predetermined value.

Referring to FIG. 2, it could be understood that the relation between the manually operable lever stroke S1, S2 of the travel operation devices and a pressure P1, P2 generated at the outlet port of travel pressure control valve 8, 9 varies respectively linearly. Therefore, the controller 10 determines that the machine selects a straight travel, if the differential pressure at each of the outlet port of the travel pressure control valve, for example, exceeds 294.2 KPa and is less than 392.3 KPa, or the machine selects a steering, if it exceeds 392.3 KPa as shown FIG. 3. Thus, the controller 10 determines whether the selection of the travel pattern (straight travel or steering) is performed depending on that the differential pressure P exceeds the threshold, for example, 392.3 KPa or not. This corresponds to a first function storage unit for deciding a straight travel. Furthermore, the controller 10 determines, whether the machine is traveling straight or traveling up a slope, depends on the magnitude of the travel load pressure. When the machine is traveling up a slope, if the travel load pressure exceeds 19613.3 KPa, the machine is traveling straight. If it is equal to or be less than 19613.3 KPa (FIG. 4), the machine travels straight on a flat ground. This corresponds to a function storage unit for determining a traveling up a slope. If the differential pressure at an outlet port of the travel pressure control valve 11, 12, for example, exceeds 392.27 KPa, the controller transmits an operation signal to the solenoid operated valve 7, so that a pilot pressure can be fed to the pilot port 5a of the shut-off 5 valve signal through the fixed displacement type hydraulic control pump 6, line 24, where the solenoid operated valve 7 is urged to move toward the valve-closing position from the valve-opening position.

The hydraulic actuator 30, 31 for work operation are, in a conventional manner, respectively actuated with the pressurized fluid through hydraulic motor drive circuits from the hydraulic pumps 1, 2 through actuation of the flow control valve 32, 33.

With such the travel motor hydraulic control system arranged, the respective pressures P1, P2 at the outlet port of the travel control valve 8, 9 connected to the control levers vary increasingly corresponding to the control lever stroke S1, S2 as shown in FIG. 2. The controller 10 determines that the machine tends to steer, if the differential pressure ΔP between the respective pressures P1 and P2 exceeds 392.27 KPa. The straight travel is set to select if it is less than 294.2 KPa. Thus, the controller 10, as shown in FIG. 3, can determine the pattern of the travel state, that is, the straight travel state and steering state; with a wider decision-range. As shown in FIG. 4, when the load pressure of the pressurized fluid supply conduit or the delivery pressure of the hydraulic pump 1, 2 detected by the pressure sensor 13A, 13B are in the range within from 17652 to 19613.3 KPa, the controller 10 determines whether the machine is set to travel up a slope or travel straight.

Accordingly, when the load pressures of the travel hydraulic motors 3, 4 vary increasingly as the differential pressure between the respective pilot pressure P1, P2 at the outlet ports of the travel control valve 8, 9 increases, the controller 10 receives the electrical signal representative of the differential pressure, compares whether it exceeds a predetermined value or not, and determined that if it exceeds the predetermined conditions, the solenoid operated valve 7 is operated to supply a pressurized fluid which is introduced through the control pump 6 and the conduit 24 to the pilot port 5a of the shut-off valve 5, so as to move the operated valve 7 toward the valve-closing position. Thereby, the connection line 23 disposed between the travel motor drive circuits 21, 22 of the hydraulic motors 3, 4 is interrupted. Since this interruption causes the pressurized fluid in the travel motor drive circuit 20, 21 to allow to be supplied individually to the travel motors 3, 4, even if a slip created on the respective track of the machine reduces temporarily the traveling load of the travel hydraulic motor, the demanded pressurized fluid from the hydraulic pumps 1, 2 are supplied individually and continuously to the travel hydraulic motors 3, 4. As a result, the restoration of a driving function is performed causing the machine to change the zigzag travel state into the straight travel state.

Now, the Table 1 shows how the travel state is determined depending on the supplying condition of the pressurized fluid. Table 1 shows how the vehicle having the first embodiment of the present invention according to the flow chart.

TABLE 1

| | Shut-off valve | | |
| --- | --- | --- | --- |
| | Closed | Opened | connection line |
| Key on | | O | communicated |
| During traveling straight on the flat ground Differential pressure at PPC valve < 392.27 Kpa Travel load pressure < 19613.3 Kpa | | O | ↑ |
| During traveling straight up a slope Differential pressure at PPC valve < 392.27 Kpa Travel load pressure > 19613.3 Kpa | O | | interrupted |
| During steering | O | | ↑ |

TABLE 1-continued

| | Shut-off valve | |
|---|---|---|
| | Closed | Opened connection line |
| Differential pressure at PPC valve > 392.27 Kpa No Travel load pressure is depended on | | |

Figure 5:
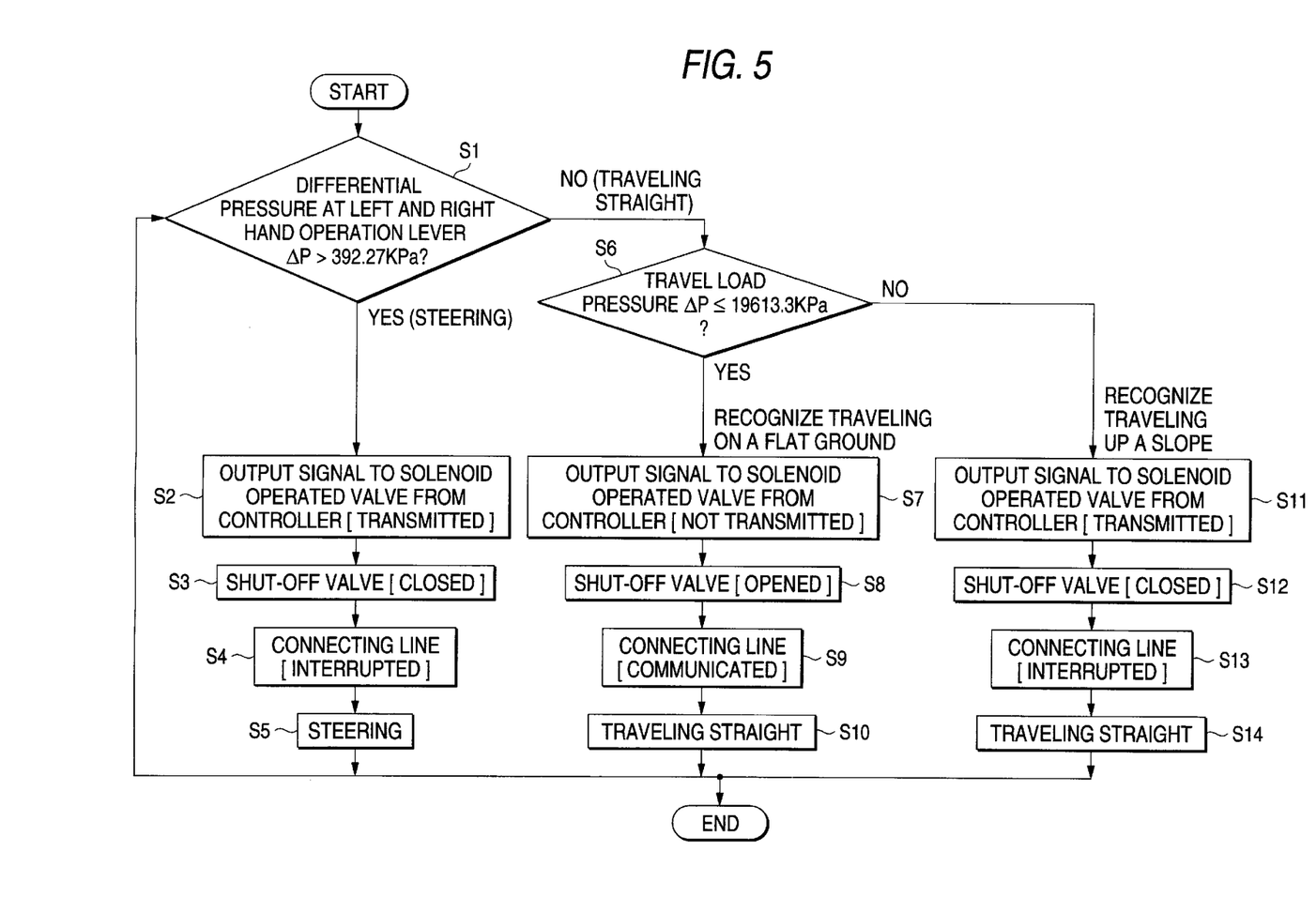
FIG. 5 is a flow chart illustrating software used in connection with a first preferred embodiment of the present invention.

Next, referring to FIG. 5, the operation condition of the machine having the first embodiment of the invention according to the flow chart will be described.

S1: The controller 10 determines whether the differential pressure ΔP between the pilot pressure at the outlet of the travel pressure control valve 8 and the pilot pressure at the outlet of the travel pressure control valve 9 through manipulating the manually operable lever exceeds 392.27 KPa or not. If it is true, the controller 10 determines that the vehicle is steering and program control passes to STEP S2. If it is false, the controller 10 determines that the vehicle is traveling straight and program control passes to STEP S6.

S2~S3: The controller 10 produces the signal and outputs it to the solenoid operated valve 7 to feed the pilot signal to the pilot port 5a of the shut-off valve 5 to move it toward the valve-closing position.

S4: When the shut-off valve 5 is moved toward the valve-closing position, the interruption of the connection line 23 between the travel motor drive circuit 20, 21 is performed.

S5: The connection line 23 which communicates with the travel motor drive circuits 20, 21 is interrupted with the shut-off valve positioned at the valve-closing. Thus, the travel hydraulic motors 3, 4 are individually supplied with the pressurized fluid from the hydraulic pump 1, 2. If the either side of the travel hydraulic motor is supplied with a large volume of pressurized fluid from the hydraulic pump 1, 2, the differential in the driving torque of the travel hydraulic motors 3, 4 is generated and causes the machine to perform a steering operation. When the steering operation of the machine comes to an end and returns to the straight travel, program control come back to the STEP 1 (S1) again.

S6: If the differential pressure ΔP is less than or be equal to 392.27 KPa, the controller determines that if the travel load pressure P is less than or be equal to 19613.3 KPa, program control passes to STEP 7 (S7). Thus, the controller 10 recognizes that the vehicle is running on the flat ground. If the travel load pressure P exceeds 19613.3 KPa, program control passes to STEP 11 (S11). Thus, the controller 10 recognizes that the vehicle is traveling up a slope.

S7~S8: If the command signal which is transmitted to the solenoid operated valve 7 is interrupted, the shut-off valve 5 is opened by the spring force. STEP 7 (S8).

S9: When the connection line 23 disposed between the travel hydraulic motor drive circuits 20, 21 are communicated each other with the shut-off valve 5 opened. The communication of the connection line 23 causes the hydraulic pump 1, 2 to allow to use in common the pressurized fluid therefrom to the travel hydraulic motors 3, 4, results in the machine performing straight travel.

S11: When the controller 10 determines that the travel load pressure P exceeds 19613.3 KPa at STEP 6 and recognizes that the vehicle is traveling up a slope, it transmits the output signal to the solenoid operated valve 5.

S12: The operation of the solenoid operated valve 7 causes the shut-off valve to be urged to move toward the valve-closing position against the spring.

S13: Next, the connection line 23 disposed between the travel hydraulic motor drive circuits 20, 21 is interrupted by the shut-off valve. The interruption of the connection line 23 causes the pressurized fluid in the travel hydraulic motor drive circuit 20, 21 to allow to individually drive the travel hydraulic motors 3, 4.

S14: When the connection line 23 is interrupted by the shut-off valve 5, and resulting highly pressurized fluid from the hydraulic pump are obtained. Thereby, the respective travel hydraulic motors 3, 4 are individually driven with the pressurized fluid delivered from the hydraulic pump 1, 2. The supply of the adequate drive pressures causes the travel motors 3, 4 to work such that the machine can maintain travel up a slope. After the STEP 10 and STEP 14, program control passes back to the STEP 1 again.

With such arranged, when the controller 10 recognizes that the differential pressured ΔP at the outlet of the pressure control valve 8, 9 through manipulation of the operation lever (not shown) exceeds the predetermined, value, the travel hydraulic motors 3, 4 are introduced individually with the pressurized fluid from the hydraulic pump 1, 2, so that the machine can keep traveling straight. Additionally, when the controller 10 recognizes that the load pressure (delivery pressure) of the fluid from the hydraulic pumps 1, 2 is greater than the predetermined value, the vehicle can keep travel straight and uphill. Even if a slip creates on either track to reduce its driving pressure for driving the travel motor during the machine is running, the interruption of the connection line 23 by the shut-off valve 5 causes the load pressure of the other travel hydraulic motor to increase up the relief point. This causes the other travel motor to obtain sufficient driving power to escape the mud, resulting the slip on the other motor in reducing to allow to travel up a slope. Consequently, the present invention has advantage that it is possible to surely prevent the machine from stopping or steering down a slope due to the decreasing load pressurized fluid to be supplied to the other side motor.

Figure 6:
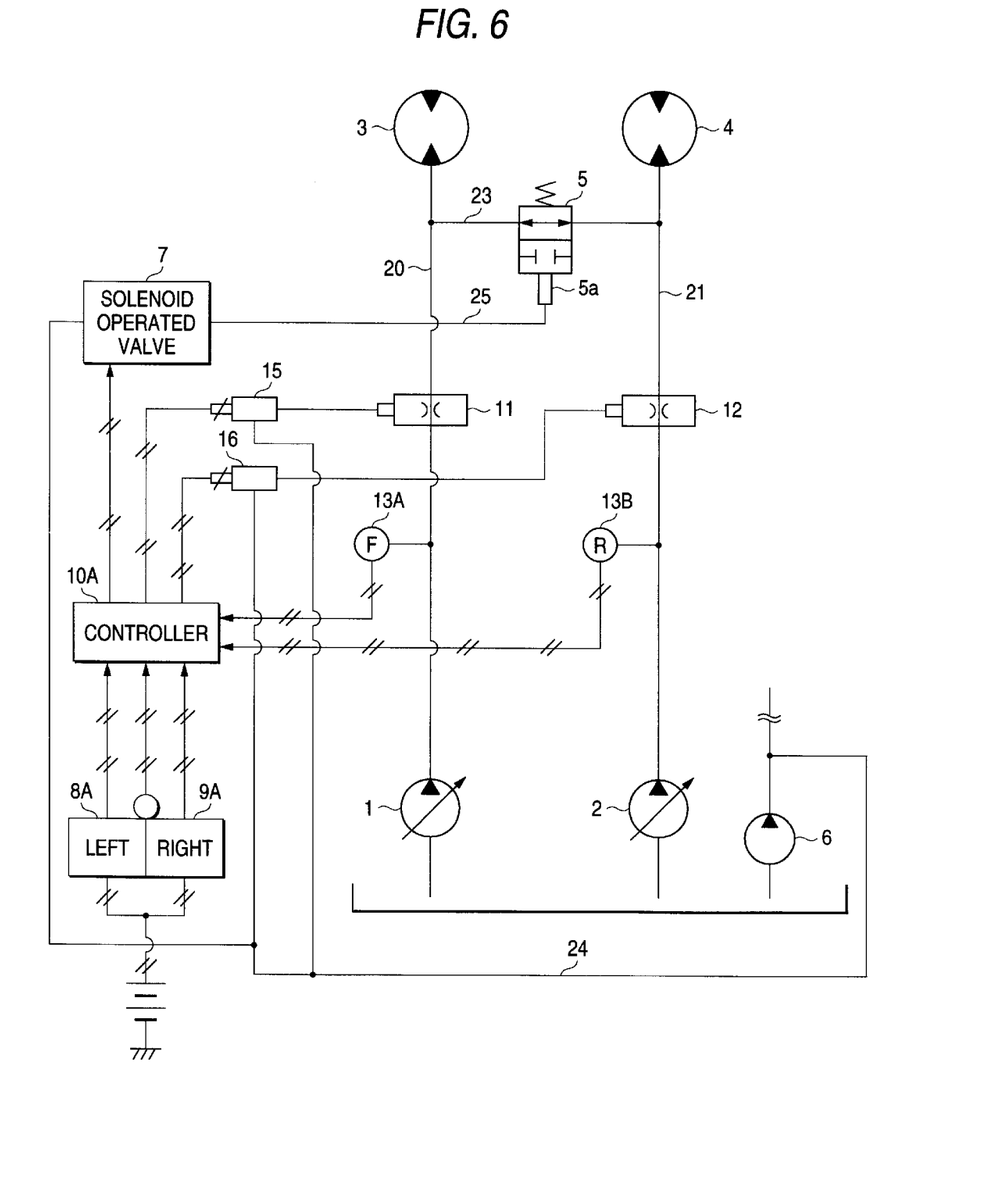
FIG. 6 is a travel motor hydraulic control system similar to FIG. 1, but respective of when an electric lever is used as a travel operable means of FIG. 1.

FIG. 6 shows a travel motor hydraulic control system of a second preferred embodiment of the present invention when an electric lever is used as substitution of the travel operable means of FIG. 1. Since many members of the second embodiment are same as that with respect to the first embodiment FIG. 1, they will not be further described but will use the same numeral.

In a travel motor hydraulic control system of the second embodiment, the left and right hand motor drive circuit 20, 21 (return conduit is not shown) of the left and right hand hydraulic pump 1, 2 driven a engine (not shown) mounted on a machine is respectively connected through the connection line 23. The SHUT OFF valve 5 disposed therein is operated to provide a connection or interruption between the motor drive circuits 20, 21.

The controller 10 receives the output signal representative of the amount of the electric lever 8A, 9A stroke. Pressure sensors 13A, 13B are respectively disposed in the delivery circuit of the hydraulic pump 20, 21. When the differential potential exceeds the predetermined value, if the sensed signals representative of the travel motor load pressure are greater than the predetermined value, the controller 10 transmits the pilot signal to the pilot port 5a of the solenoid operated valve 7 for moving toward the closing position of the shut-off valve 5 against the spring. When the valve 5 operated, the connection of the travel motor drive circuits 20, 21 are interrupted. In the drawing, numeral 15, 16 represent respectively the solenoid piloted valves which operate the travel motor control valve 11, 12 disposed in the delivery fluid circuits 20, 21.

Figure 7:
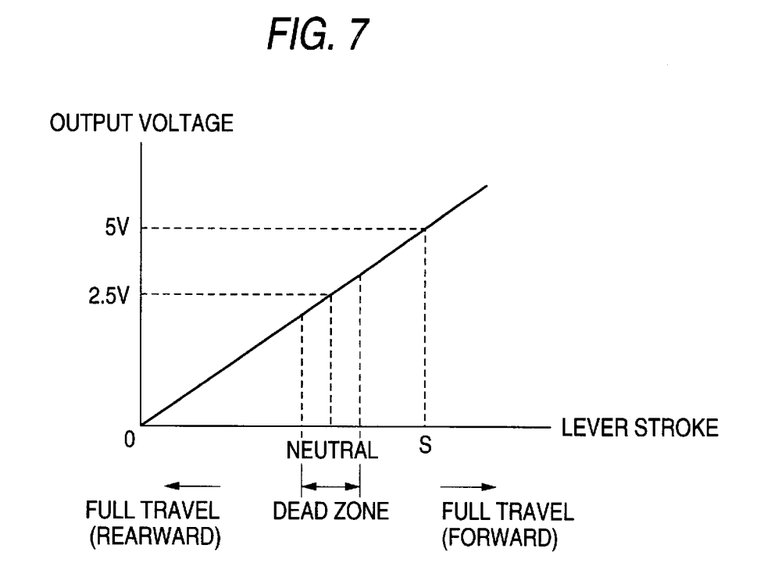
FIG. 7 is a schematic diagram showing the relation between an electric lever stroke of a travel control device and a resulting output voltage.

With such travel motor hydraulic control system arranged, it is shown in FIG. 7 that the output voltage in response to the electric lever stroke varies linearly as well as the pilot pressure in response to the pilot operated lever stroke. The controller 10 receives the differential potential of the sensed electrical signals through actuation of the electric control levers 8A, 9A and determines whether it exceed the predetermined value, for example, 1.5V, or not. If the differential potential is less than 1.5V and also the travel load pressure of the travel hydraulic motor circuit is greater than 19613.3 KPa, the controller recognizes that vehicle is traveling straight. On the other hand, if the differential potential is greater than 1.5V and also the travel load pressure of the travel hydraulic motor circuit is between 17652 KPa and 19613.3 KPa, the controller 10 recognizes that machine is traveling up a slope and thereafter transmits the pilot signal to operate the shut-off valve to interrupt the connection line 23, so that the pressurized fluid can be supplied individually to the travel motors 3, 4. The range of the electric lever stroke 8A, 9A, as shown in the FIG. 7, contains a dead zone having a predetermined range which the electric lever may be operated about an ark movement or displacement off center in forward-backward direction of the neutral position. The travel operation of the machine is not performed till the electric lever displacement passes over the dead zone.

Figure 8:
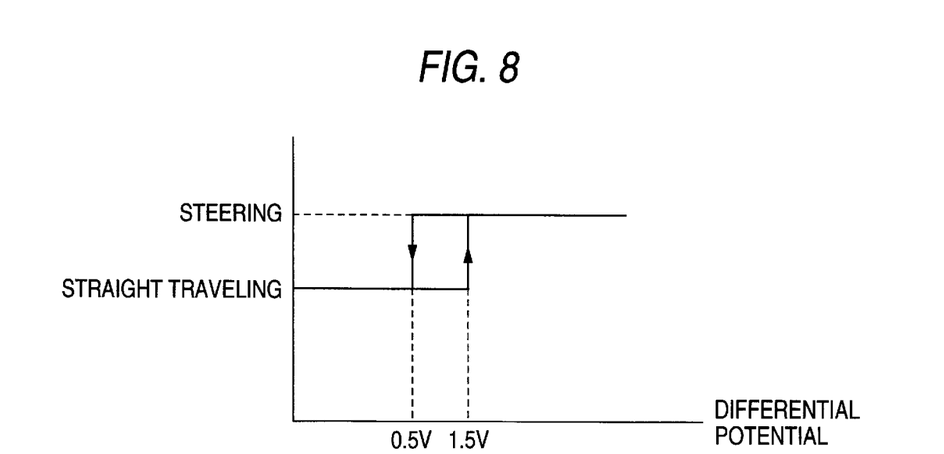
FIG. 8 is a schematic diagram showing the relation between an differential potential of the control device and the pattern of traveling state, straight travel state or steering state.

Furthermore, the controller 10 determines that the traveling condition, that is, straight traveling operation or steering operation, is determined depending on the magnitude of the differential potential, for example, 0.5V to 1.5V as shown in FIG. 8. If it exceeds 1.5V, the controller 10 determines that the steering operation is currently performing.

Now, the table 2 shows how the travel state is determined depending on the supplying condition of the pressurized fluid.

TABLE 2

| | Shut-off valve | | |
| --- | --- | --- | --- |
| | Closed | Opened | connection line |
| Key on | | O | communicated |
| During traveling straight on the flat ground Differential potential ≦ 1.5 (V) Travel load pressure ≦ 19613.3 Kpa | | O | ↑ |
| During traveling straight up a slope Differential potential ≦ 1.5 (V) Travel load pressure > 19613.3 Kpa | O | | interrupted |
| During steering Differential potential > 1.5 (V) No Travel load pressure is depended on | | O | ↑ |

Figure 9:
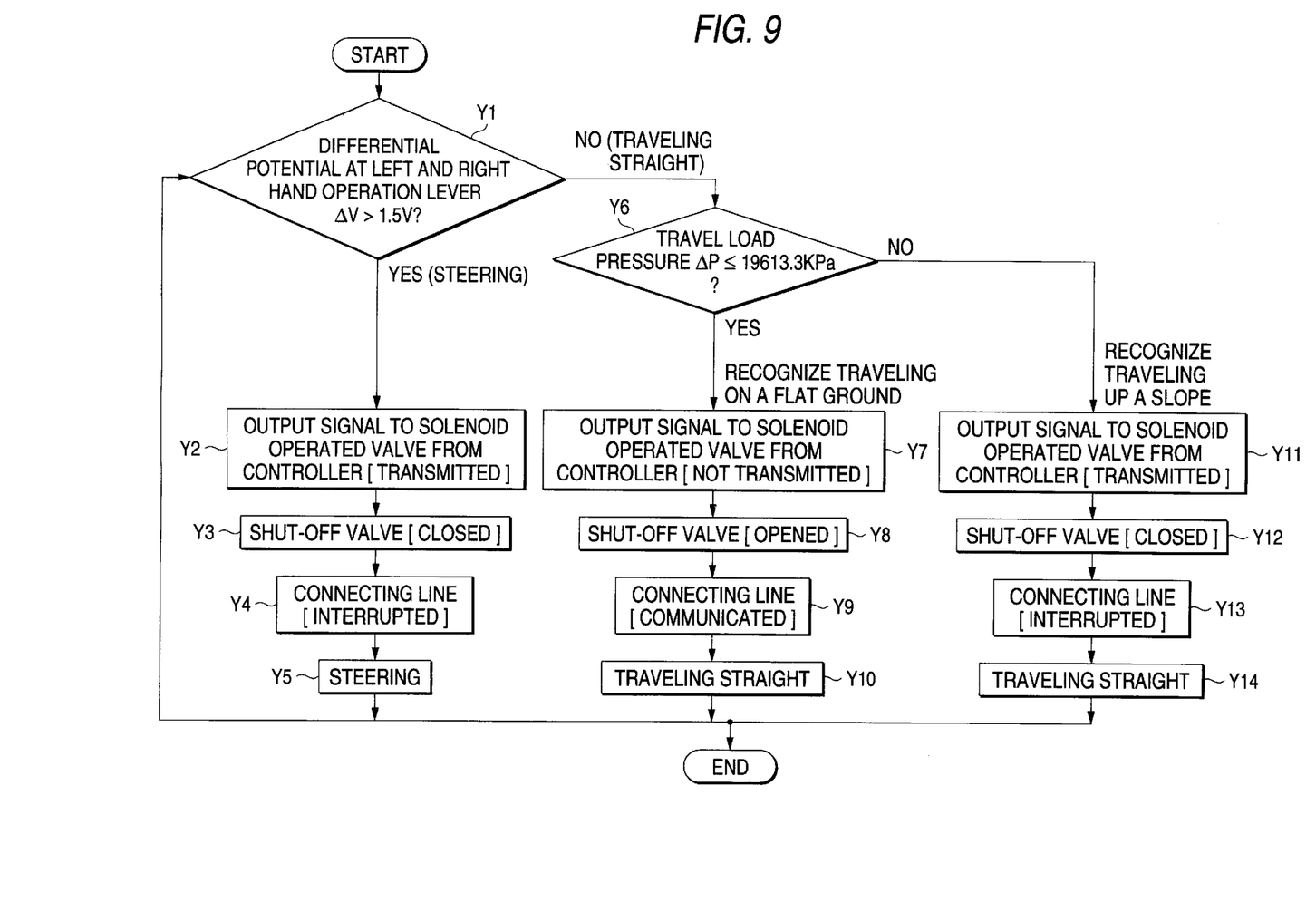
FIG. 9 is a flow chart illustrating software used in connection with a second preferred embodiment of the present invention.

Next, referring to FIG. 9, it will be described the operation condition of the machine having the second embodiment of the present invention according to the flow chart.

Y1: and the controller 10 determines whether or not the differential potential ΔV through actuation of the electric lever 8A, 9A exceeds a predetermined value, for example, 1.5V. If it is true, the controller 10 recognizes that the machine provides steering operation, and program control passes to STEP Y2. If it is false, the controller 10 determines that the machine provides travels straight, and program control passes to STEP Y6.

Y2~Y3: The controller 10 produces the output signal and transmits it to the solenoid operated valve 7 to feed the pilot signal to the pilot port 5a of the shut-off valve 5 to urge it toward the valve-closing position.

Y4: When the shut-off valve is moved toward the valve-closing position, the interruption of the connection line 23 between the travel motor drive circuit 20, 21 is performed.

Y5: The connection line 23 between the travel motor drive circuit 20, 21, which has communicated with the shut-off valve being at the valve-opening position, is interrupted with the shut-off valve being the valve-closing position. Thus, the travel hydraulic motor 3, 4 are individually supplied with the pressurized fluid from the hydraulic pump 1, 2. If the either of the travel motors is supplied with a large volume of the pressurized fluid from the hydraulic pump 1, 2, a differential torque of the travel motors is generated, which results in the steering operation being performed. When the steering operation of the machine comes to an end and recovers the normal operation, program control returns to the STEP 1 (Y1) again.

Y6: If the differential potential ΔV is less than or be equal to 1.5V, the controller 10 determines if the travel load pressure P is less than or be equal to 19613.3 KPa, program control passes to STEP 7 (Y7). Thus, the controller 10 recognizes that the vehicle is running on the flat ground. If the travel load pressure P exceeds 19613.3 KPa, program control passes to STEP11 (Y11). The controller 10 recognizes that the machine is running up a slope.

Y7~Y8: If the command signal to be transmitted to the solenoid operated valve 5 is null, the shut-off valve returns the valve-opening position by the spring force. STEP 7 (Y7).

Y9~Y10: The connection line 23 are communicated each other with the shut-off valve 5 opened. The connection between the motor drive circuits 20, 21 causes the travel motors 3, 4 to be supplied with the combined pressurized fluid from the hydraulic pump 1, 2, results in the machine performing straight travel.

Y11: When the controller 10 determines that the travel load pressure P exceeds 19613.3 KPa at STEP 6 and recognizes that the machine is traveling up a slope, it transmits the output signal to the solenoid operated valve 7.

Y12~Y13: The operation of the solenoid operated valve 7 causes the shut-off valve to be urged to move toward the valve-closing position. Next, the connection line 23 is interrupted by the shut-off valve and thereby the pressurized fluid in the travel motor drive circuit 20, 21 is supplied to individually thereto.

Y14: When the connection line 23 is interrupted by the shut-off valve 5 and resulting highly pressurized fluid from the hydraulic pump are obtained. Thereby, the respective travel hydraulic motors 3, 4 is individually driven with the pressurized fluid delivered from the hydraulic pump 1, 2. The supply of the adequate drive pressures causes the travel motors 3, 4 to work such that the machine can maintain travel up a slope. After the STEP 10 (Y10) and STEP 14 (Y14), program control passes back to the STEP 1 (Y1) again.

The second embodiment of the present invention provides the same advantages as the first embodiment of the present invention.

In the foregoing description appropriate action was taken based on whether the current travel condition is the straight travel or the traveling up a slope, which is determined depending on whether the amount of the travel load pressure (the delivery pressure of the hydraulic pump supplied for driving the hydraulic motor 3, 4) are greater or less than the predetermined value. Likewise, the same is true, if an inclinometer (not shown) is mounted on the machine body and detects a tilt angle of the machine and transmits the detected signal to the controller 10. The controller 10 can determine whether or not the detected signal exceeds the predetermined value. If it is greater than the predetermined value, the controller 10 recognizes that the vehicle is traveling up a slope.

Figure 10:
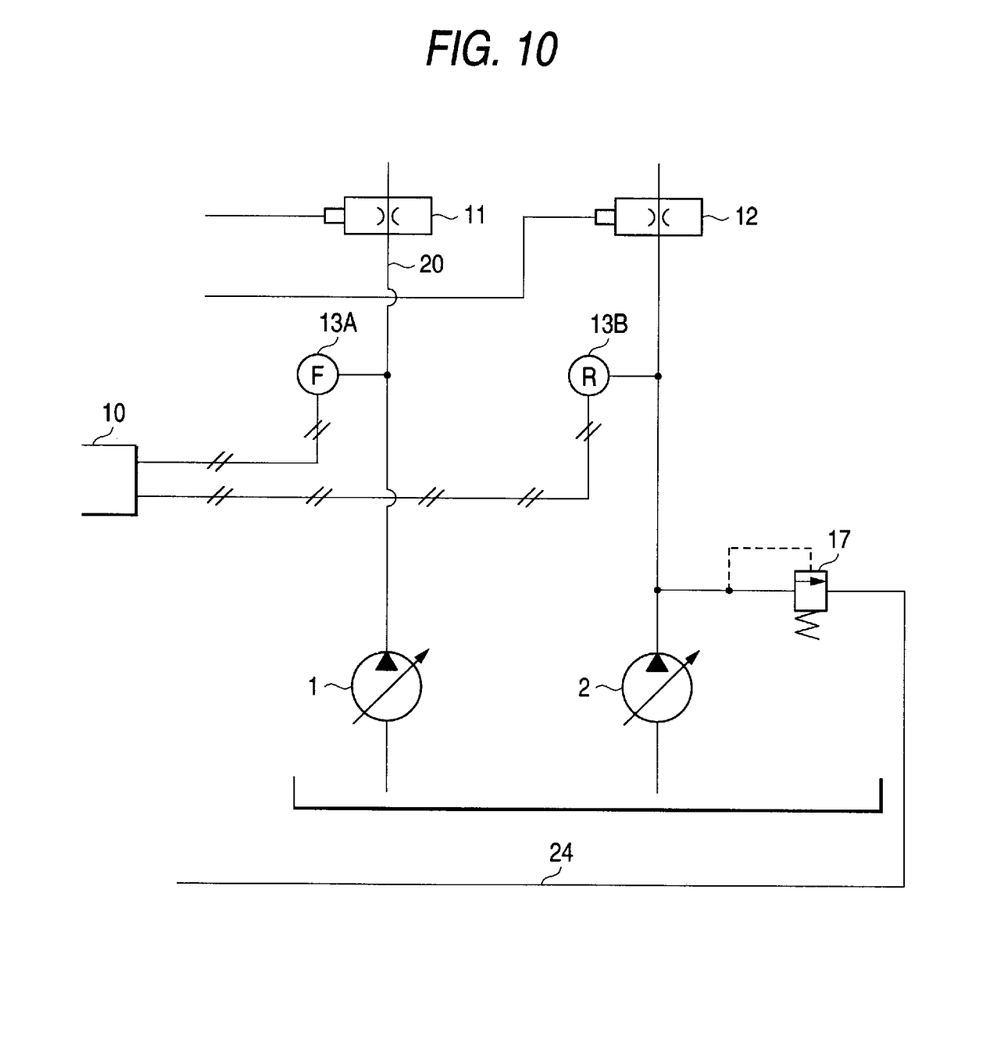
FIG. 10 is a schematic view of a travel motor hydraulic control system similar to FIG. 1, but respective of when the control pressurized fluid is available in by reducing the delivery pressure of the hydraulic main pump.

In the description of the first and the second embodiment, the pressure signal line from the fixed displacement type control pump 6 is fed to the pilot port 5$a$ of the shut-off valve 5 disposed in the connection line 23 between the travel motor drive circuits 20, 21 to move it towards the valve-closing position. Likewise, the same is true if the divided pressurized fluid from the hydraulic pump 1 or 2 is reduced through the reducing valve 1 and fed to the pressure control valve 8, 9 through the line 24 instead of the pressure signal line from the fixed displacement type control pump 6 driven by the engine.

What we claim is:

1. Travel motor hydraulic control system for a construction machine having a plurality of hydraulic pumps which supply individually pressurized fluid for a plurality of hydraulic travel motors and a plurality of flow control valves which control the flow rate of the pressurized fluid to be supplied to the motor during an ordinary work comprising;

a pilot operated shut off valve disposed between a left and right hand travel motor drive circuit,     a position sensor connected to an operating control valve for detecting a lever stroke thereof;

a pressure sensor for detecting a fluid pressure in the respective travel motor circuit disposed therein;

a controller including a first storage unit and second storage unit, the first storage unit storing a function for determining if or not the vehicle is traveling straight, the second storage unit storing a function for determining if or not the vehicle is traveling up a slope, the controller receives the control signal representative of the travel control lever stroke sensed by the position sensor and a control signal detected by the pressure sensor, determines if the vehicle is traveling up a slope, and transmits a command signal to a solenoid operated valve to move the pilot operated shut off valve toward the valve-closing position, thereby the travel hydraulic motors are individually supplied the pressurized fluid from the hydraulic pumps.

2. Travel motor hydraulic control system for a construction machine according to claim 1, wherein said controller receives a control signal representative of the difference pressure between the pilot pressure corresponding to the lever stroke of the operating control valve for the left hand travel motor and the pilot pressure corresponding to the lever stroke of the operating control valve for the right hand travel motor, and transmits a signal to said solenoid operated valve to operate said shut-off valve if the differential pressure exceeds a predetermined value.

3. Travel motor hydraulic control system for a construction machine according to claim 1, wherein said controller receives a control signal representative of the differential potential between an output voltage corresponding to the lever stroke of the operating control valve for the left hand travel motor and an output voltage corresponding to the lever stroke of the operating control valve for the right hand travel motor, and transmits a signal to said solenoid operated valve to operate said shut-off valve if the differential pressure exceeds a predetermined value.

4. Travel motor hydraulic control system for a machine according to claim 1, further including a detecting means for measuring a inclined angle of the machine, said controller receives a control signal detected by the detecting means, and transmits a control signal representative of traveling up a slope to said solenoid operated valve to operate the shut-off valve if the detected angle exceeds a predetermined value.

5. Travel motor hydraulic control system for a machine according to claim 2, further including a detecting means for measuring a inclined angle of the machine, said controller receives a control signal detected by the detecting means, and transmits a control signal representative of traveling up a slope to said solenoid operated valve to operate the shut-off valve if the detected angle exceeds a predetermined value.

6. Travel motor hydraulic control system for a machine according to claim 3, further including a detecting means for measuring a inclined angle of the machine, said controller receives a control signal detected by the detecting means, and transmits a control signal representative of traveling up a slope to said solenoid operated valve to operate the shut-off valve if the detected angle exceeds a predetermined value.

* * * * *